United States Patent [19]

Kimura

[11] 4,411,788
[45] Oct. 25, 1983

[54] FILTER FOR GASOLINE TANK
[75] Inventor: Shigeru Kimura, Kamakura, Japan
[73] Assignee: Nifco Inc., Yokohama, Japan
[21] Appl. No.: 377,481
[22] Filed: May 12, 1982
[51] Int. Cl.³ ............................................ B01D 25/00
[52] U.S. Cl. ................................... 210/439; 210/460
[58] Field of Search ............... 210/460, 461, 462, 463, 210/416.4, 172, 438, 453, 485, 439; 285/DIG. 22; 24/255 R, 257; 215/309; 222/542, 567; 55/378

[56] References Cited
U.S. PATENT DOCUMENTS

| | | | |
|---|---|---|---|
| 1,228,427 | 6/1917 | Gifford | 210/463 |
| 2,744,776 | 5/1956 | Brown | 210/172 |
| 3,049,171 | 8/1962 | Neuerburg et al. | 210/172 |
| 3,804,258 | 4/1974 | Okuniewski et al. | 210/460 |
| 3,833,124 | 9/1974 | Sugiyama et al. | 210/460 |
| 4,118,323 | 10/1978 | Sugiyama et al. | 210/463 |
| 4,204,960 | 5/1980 | Sugiyamo et al. | 210/438 |

FOREIGN PATENT DOCUMENTS 518541  5/1921  France .................. 210/460

Primary Examiner—Charles N. Hart
Assistant Examiner—John W. Czaja
Attorney, Agent, or Firm—J. R. Halvorsen; T. W. Buckman

[57] ABSTRACT

A filter for use in a gasoline tank comprises a filter body provided in the upper portion thereof with an insertion hole for permitting passage of a suction pipe possessing a radially bulged engaging portion, resilient arms extended directly from the upper edge of the filter body or from an upper lid to be fitted to the filter body, and a retaining member supported in position by the resilient arms.

The suction pipe can be securely retained at a proper position on the filter without entailing any unwanted motion within the gasoline tank by simply inserting the suction pipe having the radially bulged engaging portion through the insertion hole of the filter body.

5 Claims, 6 Drawing Figures

FIG.1
FIG.2
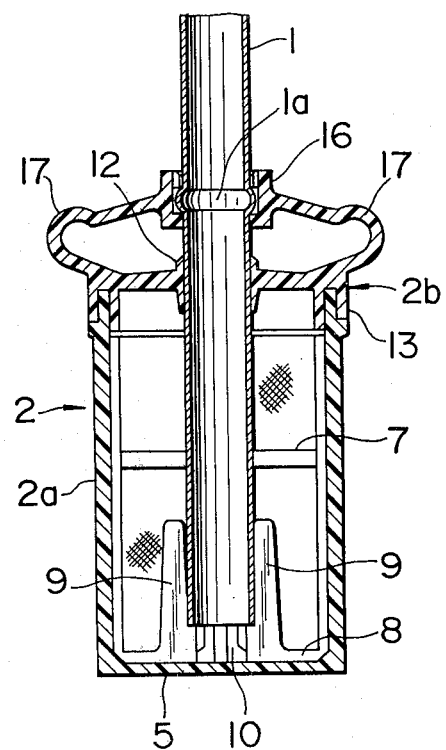
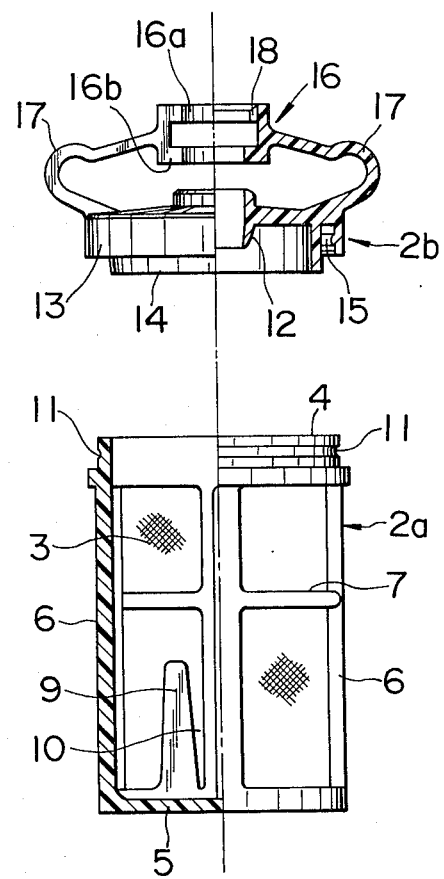

FILTER FOR GASOLINE TANK

BACKGROUND OF THE INVENTION

This invention relates to a filter to be provided for the gasoline tank in an automobile.

As is well known, the suction pipe for drawing gasoline from the gasoline tank is provided at the tip thereof with a filter adapted to prevent impurities from being entrained by the gasoline being drawn. Such filters heretofore known in the art are mostly of a type having a net stretched along the periphery thereof. In the upper lid for closing the upper opening of the filter body, an insertion hole is perforated, through which the suction pipe may be passed to be thrust into the interior of the filter body. The pipe is tightly attached to the insertion hole so as to prevent the filter from coming off the tip of the pipe. To render this attachment stable and constant, there is generally followed the practice of providing a bulged portion on the periphery at a stated position in the entire length of the pipe, causing the bulged portion to be forcibly pushed into engagement with the edge of the insertion hole, and enabling the insertion hole to keep firm hold of the pipe in consequence of the forced engagement.

The conventional filter, as viewed from the standpoint of its relation with the suction pipe, therefore, has no noticeable problem because it is attached easily and retained fast in the attached state. As viewed from the standpoint of its relation with the gasoline tank, however, the filter has one problem yet to be solved.

To be specific, the suction pipe is required to draw the gasoline completely from the gasoline tank and, in this respect, is desired to have the tip thereof reach the bottom of the gasoline tank. The pipe fitted with the filter, therefore, is disposed within the gasoline tank in such a manner that the bottom of the filter may come into contact with the bottom of the tank. In the mass production of gasoline tanks and suction pipes to be inserted into the gasoline tanks, although they are manufactured in standard sizes fixed in advance, gasoline tanks and suction pipes so produced rarely fail to function due to errors of fabrication to some extent. It is not unlikely, therefore, that some suction pipes will not be fixed at a stated position within gasoline tanks because the bottoms of their filters are stopped short of advancing to their full depths owing to their collision with the bottom surfaces of tanks and some other suction pipes will be suspended within gasoline tanks because their filters fall short of reaching the bottom surfaces of tanks. It has been difficult for all the produced suction pipes to be disposed accurately in a fixed state within the produced gasoline tanks.

SUMMARY OF THE INVENTION

One object of the present invention is to overcome the disadvantage suffered by the conventional filter as described above and to provide for the gasoline tank a filter so constructed that the bottom of the filter attached to the tip of the pipe can be easily disposed as safely held in contact with the bottom surface of the tank even when the size of the tank varies more or less from the standard size or the length of the pipe varies more or less from the standard length.

Another object of this invention is to provide for the gasoline tank a filter so constructed that the tip of the pipe inserted into the interior of the filter can be received and retained at a fixed position and prevented from moving about the filter interior and consequently inflicting damage upon the net stretched around the periphery of the filter, with the result that possible error of fabrication will be thoroughly absorbed.

To accomplish the objects described above, the present invention provides a filter for the gasoline tank which conprises a filter body having a net stretched along the periphery thereof and an insertion hole formed in the upper portion thereof for permitting passage therethrough of a suction pipe containing a radially bulged portion as an engaging portion; a pair of resilient arms extended from the upper edge of the filter body; and a retaining member supported in position on the resilient arms.

By simply inserting the suction pipe containing the radially bulged portion through the aforementioned retaining member and the upper insertion hole of the filter body and fixing the radially bulged portion of the suction pipe in the retaining member, the tip of the suction pipe can be received and retained at the stated position at which the tip is fastened to the bottom surface of the tank and the tip can be prevented from producing any unwanted motion within the tank and inflicting damage upon the net of the filter.

The resilient arms formed on the filter body may be integrally formed directly on the filter. Otherwise, the upper part of the filter body may be separately formed as an upper lid and the aforementioned arms may be provided on the upper lid. The retaining member is composed of one pair of vertically separated rings and the upper one of the pair of rings is adapted to be expanded for permitting passage of the radially bulged portion of the suction pipe and the lower one of them is formed with an inside diameter equallizing the diameter of the retaining member so as to keep fast hold of the radially bulged portion of the suction pipe.

The other objects and characteristics of the present invention will become apparent from the further disclosure of the invention to be given hereinafter with reference to the accompanying drawings.

BRIEF EXPLANATION OF THE DRAWINGS

FIG. 1 is a longitudinal cross sectional view illustrating one preferred embodiment of the filter according to the present invention, with the filter held in a state of actual use.

FIG. 2 is a front view illustrating the filter in a disassembled state, with one half portion thereof sectioned.

DESCRIPTION OF THE PREFERRED EMBODIMENTS

Figure 3:
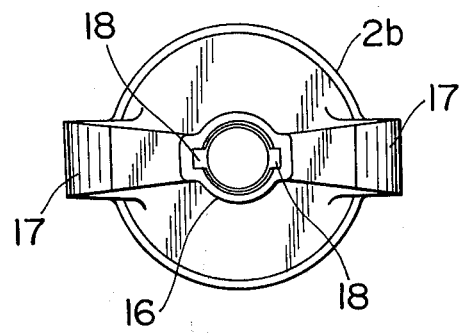
FIG. 3 is a plan view of the upper lid of the filter according to the present invention.
Figure 4:
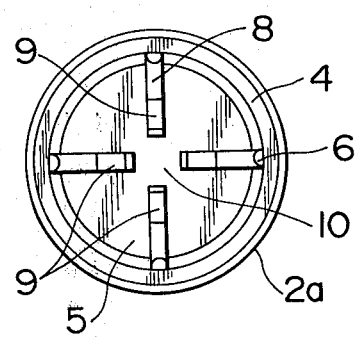
FIG. 4 is a plan view of the filter body of the filter according to the present invention.
Figure 5:
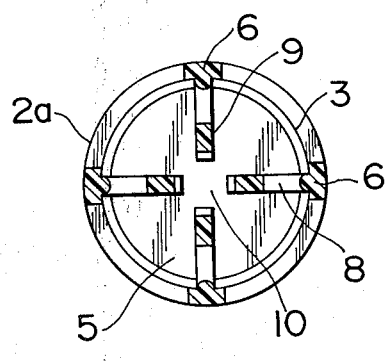
FIG. 5 is a cross section taken along the V—V line in the diagram of FIG. 2.
Figure 6:
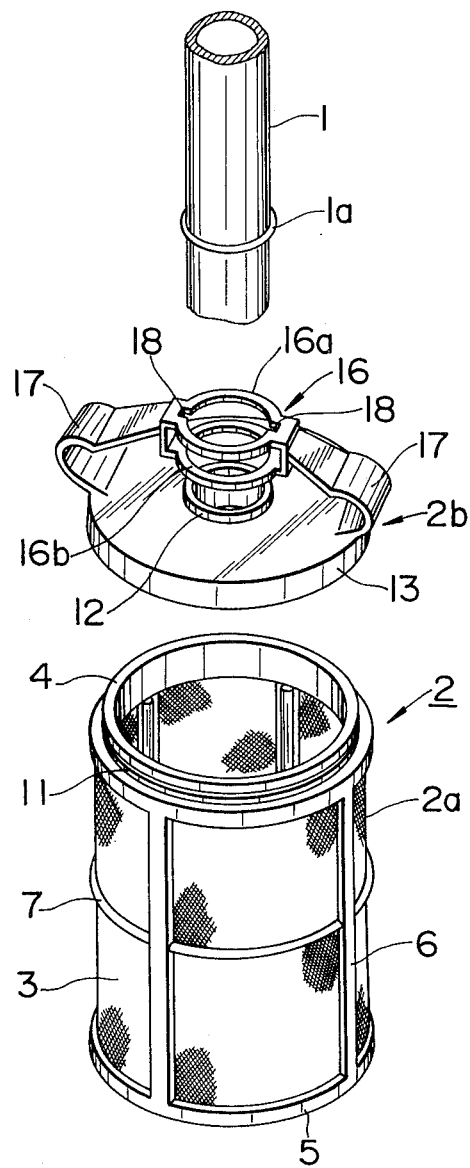
FIG. 6 is an exploded perspective view of the filter according to the present invention.

The present invention will be described below with reference to the illustrated embodiment. FIG. 1 is a longitudinal cross section taken along the center of a filter 2 of the present invention as fitted with a suction pipe 1 and FIG. 2 is an exploded view of the filter, with one half portion thereof cut away.

The filter 2 in this embodiment comprises a cup-shaped filter body 2a having a net stretched around the periphery thereof and a cap-shaped lid 2b for covering the upper opening of the filter body.

The filter body 2a possesses a mouth portion 4 of the shape of a short cylinder and a bottom plate 5. Between the mouth portion (opening) 4 and the bottom plate 5, four support columns 6 are extended as equally spaced circumferentially. Halfway along the height of these support columns 6, an annular reinforcing frame 7 is extended across the support columns to complete a skeleton of the filter body. A cylindrical net 3 is laid and attached fast to the inner sides of the support columns 6 and the reinforcing frame 7, so that the filter body 2a may assume the shape of a cup as a whole. From the upper side of the bottom plate 5, four ribs 8 are raised as radially spaced by a fixed angular interval of 90°. From these ribs 8, four support pieces 9 are perpendicularly extended one each so as to form a receiving portion 10 serving to receive and retain the tip of the suction pipe 1.

The skeleton of this filter body including the opening 4 and the bottom plate 5 is integrally molded of a synthetic resin. During this molding, the cylindrical net 3 is fused to the skeleton. At the same time, a fitting groove 11 on which the upper lid 2b is to be hooked as described more fully in a latter paragraph is formed in the opening 4.

The upper lid 2b is formed approximately in the shape of a cap, with a cylindrical insertion hole 12 for passing the suction pipe 1 perforated at the center of the cap.

Inside an outer cylindrical portion 13 provided along the periphery of the upper lid, an inner cylindrical portion 14 is formed as separated therefrom by a distance substantially equal to the wall thickness of the opening 4 of the aforementioned filter body. On the inner wall surface of the outer cylindrical portion 13, there is formed an annular engaging projection 15 adapted for engagement with a fitting groove 11 which is formed on the outer peripheral surface of the opening 4.

In the drawing, 16 denotes a retaining member supported at a distance directly above the insertion hole 12 by two arms 17 which are extended from the upper lid and adapted to exhibit resilience.

This retaining member keeps hold of one portion of the whole length of the suction pipe 1 inserted past the aforementioned insertion hole 12 into the interior of the filter. It serves as means for substantially fastening the filter to the pipe. In the present embodiment, it is composed of two rings 16a and 16b which are vertically opposed to each other across a space. The inside diameter of the upper and lower rings and the outside diameter of the pipe 1 are roughly equalized to permit passage of the pipe through the rings. The upper ring 16a has a notch cut in part of the inner peripheral surface thereof to form a recess 18. By spreading this recess, the inside diameter of the upper ring can be increased enough to pass the radially bulged portion as an engaging portion which is formed intermediate the length of the pipe 1 and intended as an engaging portion.

Similarly to the aforementioned filter body 1, the upper lid 2 provided with the retaining member 16 is integrally molded of a synthetic resin such as nylon resin.

The filter body 2a and the upper lid 2b described above are separately molded. They are joined into one piece by mounting the upper lid 2b on the opening 4 of the filter body and fitting the opening 4 into the annular space between the inner and outer cylindrical portions 13 and 14 of the upper lid 2b. At this time, the annular projection 15 formed on the inner wall surface of the outer cylindrical portion 13 slides into the fitting groove 11 and comes into tight contact therewith to preclude occurrence of a void between the filter body and the upper lid and keep them fast to each other lest they should easily separate from each other.

After the filter has been completed with the filter body fitted fast into the upper lid as described above, the suction pipe 1 is thrust into the filter interior through the upper and lower rings 16a and 16b of the retaining member 16. Then, the radially buldged portion 1a formed intermediate the length of the pipe is forced past the upper ring 16a of the retaining member 16 while causing the upper ring 16a to be spread out. The radially bulged portion 1a is brought to the space intervening between the upper and lower rings, so that the two rings will nip the radially bulged portion 1a fast in position, completing the attachment of the filter to the pipe.

The radially bulged portion 1a provided intermediate the length of the pipe is formed at a stated distance from the tip of the pipe. This distance is equal to the distance between the receiving portion 10 and the retaining member 16 which is determined by the fitting of the filter body 2a and the upper lid 2b. When the radially bulged portion 1a of the pipe comes to be retained by the retaining member 16 in consequence of the insertion of the pipe as described above, the tip of the pipe reaches the receiving portion 10 and is consequently engulfed in the four support pieces 9 and prevented from swaying in lateral directions.

The filter of the present invention is constructed as described above. With respect to the gasoline tank (not shown), this filter as attached fast to the tip of the pipe 1 is inserted into the gasoline tank in conjuction with the pipe and, similarly to the conventional filter, disposed therein so as to come into contact with the bottom surface of the tank. The portion of the pipe falling intermediate the distance from the fitting port of the tank for the pipe to the tip of the pipe is fixed at a fixed portion in accordance with a design drawing and the tank is tightly sealed.

In the attachment of the filter to the tank, if the size of the tank, more specifically the distance from the fitting port of the tank for the pipe to the bottom surface, is varied because of error of fabrication or if the length of the pipe from the position at which the pipe is fixed at the fitting port to the tip of the pipe is more or less varied by reason of error of fabrication, the conventional filter has the possibility that the filter itself will not be fixed in position at all because the pipe fitting port formed in the tank and the position for the attachment of the pipe fall out of alignment or the bottom of the filter will stop short of reaching the bottom surface of the tank and remain suspended within the tank interior because the length of the pipe inserted into the tank interior is not sufficient. In the case of the filter of the present invention which is constructed as described above, since the radially bulged portion 1a functioning as an engaging means of the pipe is retained by the retaining member 16 and fixed to the filter through the medium of the resilient arms 17, the aforementioned drawbacks suffered by the conventional filter can be precluded by fixing the length between the radially bulged portion 1a and the position at which the pipe is fastened to the tank at the design distance from the fitting port in the tank to the bottom surface of the tank, inclusive of the largest possible error of fabrication.

When the error of fabrication is largest, the bottom of the filter will automatically come into contact with the bottom surface of the tank. When the error of fabrication is smallest, then the aforementioned arms 17 will be bent and the retaining member 16 will be brought closer to the insertion hole 12 of the upper lid 2b in proportion to the shortage of length due to the reduction of error of fabrication. Thus, the possible variation in the size of the tank or the length of the pipe due to error of fabrication is absorbed.

According to the present invention, therefore, the filter which is always inserted in conjunction with the pipe into the tank can be disposed in a state held in contact with the bottom surface of the tank end, even when the fitting port of the tank for the pipe and the position for the attachment of the pipe fall out of alignment because of variation in the size of the tank or the length of the pipe due to possible error of fabrication, the bend of the resilient arms 17 in the filter will automatically adjust itself to absorb the variation. The work of the attachment, therefore, can be easily effected without exerting any immoderate stress upon the filter itself and the pipe. This invention has a salient advantage that the attachment causes neither damage to the filter nor deformation to the pipe.

When the arms 17 are bent to absorb the aforementioned error of fabrication, the tip of the pipe inserted into the filter interior will be consequently moved in a vertical direction. This movement of the tip of the pipe occurs within the support pieces 9 rising from the bottom plate 5 and always remains enclosed therein, there is no possibility of the tip of the pipe doing damage to the net 3. Of course, since the retention of the tip of the pipe by these support pieces 9 begins at the same time that the filter is attached, it proves to be effective in preventing the filter from being inclined during the insertion of the pipe into the tank.

The filter so far described represents one embodiment of this invention. The idea of completing the filter specifically by assembling the filter body 2a and the upper lid 2b formed separately in advance has issued from the consideration paid to the convenience of manufacture and should not be regarded as limiting the manner of manufacture of the filter. The embodiment has been described as having arms 17 raised from the upper lid 2b. When the filter body and the upper lid are integrally formed in one piece, for example, these arms 17 may be extended from the portion of filter body. The number of such arms need not be limited to two. Further, as regards the retaining ring 16, it is clear from the foregoing description that it is intended to serve as means for fastening the filter in position by being brought into agreement with the engaging portion formed on the pipe. This particular means, therefore, may be formed in any other construction insofar as the object thereof described above is fulfilled. For example, a method for obtaining the retaining member by the steps of preparing a simple cylinder, causing an engaging portion of an increased diameter to be inserted tightly around the cylinder, and fixing the engaging portion so fast on the cylinder that it may not easily come off the cylinder is effectively used to embody this invention without departing from the spirit of the invention.

What is claimed is:

1. In a filter for a gasoline tank, comprising a generally cup shaped filter body having a base and sidewalls containing a net stretched along the periphery thereof and a lid formed to cover the open end of said filter body and provided with an insertion hole for permitting a suction pipe to be inserted into the interior of said filter body and fastened therein, said suction pipe being provided intermediate the length thereof with an engaging portion; said lid further including a retaining member disposed substantially coaxially above said insertion hole and spaced from said lid, and at least a pair of resilient arms integrally attached to said lid and said retaining member for supporting in position said retaining member in spaced relation from said lid, said retaining member being adapted to resin said suction pipe when the free end of said suction pipe is telescoped through said retaining member and said insertion hole until said engaging portion of said suction pipe is moved into fast engagement with said retaining member; and means positioned within said filter body for moveably locating said suction pipe free end.

2. A filter for gasoline tank according to claim 1, wherein said retaining member is composed of an upper ring and a lower ring which are vertically opposed in spaced relation to each other, said upper ring including means to make it expansible so as to permit said engaging portion formed on the suction pipe to be passed therethrough, and the space between said upper and said lower rings is adapted to receive and retain fast said engaging portion.

3. A filter for a gasoline tank according to claim 1 wherein said means for locating the suction pipe within the filter body include a plurality of axially extending circumferentially spaced support pieces which extend from the base of said filter body toward said open end and define a cavity spaced from the sidewalls and adapted to slidably accept said suction pipe.

4. A filter for a gasoline tank according to claim 3 wherein said resilient arms resiliently insure movement of said suction pipe to an optimum position relative to the base of said filter body and the gasoline tank in which it is utilized.

5. A filter for a gasoline tank according to claim 2 wherein said upper ring is radially relieved in at least one point to render it resiliently expandable to permit said engaging portion to pass therethrough.

* * * * *